(12) United States Patent
Walker, Jr. et al.

(10) Patent No.: US 10,844,160 B2
(45) Date of Patent: Nov. 24, 2020

(54) FLEXIBLE MICROSPHERE ARTICLES HAVING HIGH TEMPERATURE STABILITY

(71) Applicant: 3M INNOVATIVE PROPERTIES COMPANY, St. Paul, MN (US)

(72) Inventors: Christopher B. Walker, Jr., St. Paul, MN (US); John C. Clark, Maplewood, MN (US); Alexander J. Kugel, Woodbury, MN (US); Vivek Krishnan, St. Paul, MN (US); Abdullahi A. Mohamud, Minnetonka, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 435 days.

(21) Appl. No.: 15/550,140

(22) PCT Filed: Jun. 15, 2015

(86) PCT No.: PCT/US2015/035726
§ 371 (c)(1),
(2) Date: Aug. 10, 2017

(87) PCT Pub. No.: WO2016/130172
PCT Pub. Date: Aug. 18, 2016

(65) Prior Publication Data
US 2018/0044465 A1    Feb. 15, 2018

Related U.S. Application Data

(60) Provisional application No. 62/115,950, filed on Feb. 13, 2015.

(51) Int. Cl.
*C08G 18/10* (2006.01)
*C08G 18/72* (2006.01)
(Continued)

(52) U.S. Cl.
CPC ............. *C08G 18/72* (2013.01); *B32B 5/022* (2013.01); *B32B 5/024* (2013.01); *B32B 5/026* (2013.01);
(Continued)

(58) Field of Classification Search
CPC ............ C08G 18/10; C08L 75/04; C09D 5/04
(Continued)

(56) References Cited

U.S. PATENT DOCUMENTS

| T987,003 I4 | 10/1979 | Johnson |
| 4,849,265 A | 7/1989 | Ueda |

(Continued)

FOREIGN PATENT DOCUMENTS

| WO | WO 2014-055828 | 4/2014 |
| WO | WO 2015-123526 | 8/2015 |

OTHER PUBLICATIONS

International Search Report for PCT International Application No. PCT/US2015/035726, dated Sep. 15, 2015, 3 pages.

*Primary Examiner* — Betelhem Shewareged
(74) *Attorney, Agent, or Firm* — Bradford B. Wright

(57) ABSTRACT

There is provided an article a binder resin layer comprising an aliphatic polyurethane polymer comprising a plurality of soft segments, and a plurality of hard segments, where the soft segments comprise polycarbonate polyol; and a plurality of microspheres partially embedded and adhered to a first major surface of the binder resin layer, wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C.

22 Claims, 1 Drawing Sheet

(51) Int. Cl.

| | | |
|---|---|---|
| C08G 18/24 | (2006.01) | |
| C08G 18/75 | (2006.01) | |
| C08G 18/70 | (2006.01) | |
| C08G 18/08 | (2006.01) | |
| C08G 18/66 | (2006.01) | |
| B32B 5/18 | (2006.01) | |
| B32B 25/04 | (2006.01) | |
| B32B 27/10 | (2006.01) | |
| B32B 27/32 | (2006.01) | |
| C08G 18/79 | (2006.01) | |
| B32B 27/30 | (2006.01) | |
| C08K 7/24 | (2006.01) | |
| C08G 18/44 | (2006.01) | |
| C09J 175/04 | (2006.01) | |
| B32B 5/16 | (2006.01) | |
| B32B 5/30 | (2006.01) | |
| B32B 5/02 | (2006.01) | |
| B32B 9/04 | (2006.01) | |
| B32B 25/12 | (2006.01) | |
| B32B 15/08 | (2006.01) | |
| B32B 15/16 | (2006.01) | |
| B32B 7/04 | (2019.01) | |
| B32B 27/06 | (2006.01) | |
| B32B 25/06 | (2006.01) | |
| B32B 25/14 | (2006.01) | |
| B32B 29/04 | (2006.01) | |
| B32B 25/08 | (2006.01) | |
| B32B 27/08 | (2006.01) | |
| C08G 18/32 | (2006.01) | |
| B32B 27/12 | (2006.01) | |
| B32B 5/14 | (2006.01) | |
| B32B 27/36 | (2006.01) | |
| C08K 7/00 | (2006.01) | |
| C09D 5/04 | (2006.01) | |
| C08L 75/04 | (2006.01) | |
| B32B 7/02 | (2019.01) | |
| B32B 7/12 | (2006.01) | |
| B32B 27/14 | (2006.01) | |
| B32B 27/40 | (2006.01) | |
| C08G 71/04 | (2006.01) | |

(52) U.S. Cl.
CPC ............... *B32B 5/142* (2013.01); *B32B 5/16* (2013.01); *B32B 5/18* (2013.01); *B32B 5/30* (2013.01); *B32B 7/02* (2013.01); *B32B 7/04* (2013.01); *B32B 7/12* (2013.01); *B32B 9/045* (2013.01); *B32B 9/048* (2013.01); *B32B 15/08* (2013.01); *B32B 15/16* (2013.01); *B32B 25/047* (2013.01); *B32B 25/06* (2013.01); *B32B 25/08* (2013.01); *B32B 25/12* (2013.01); *B32B 25/14* (2013.01); *B32B 27/065* (2013.01); *B32B 27/08* (2013.01); *B32B 27/10* (2013.01); *B32B 27/12* (2013.01); *B32B 27/14* (2013.01); *B32B 27/308* (2013.01); *B32B 27/32* (2013.01); *B32B 27/36* (2013.01); *B32B 27/365* (2013.01); *B32B 27/40* (2013.01); *B32B 29/04* (2013.01); *C08G 18/0819* (2013.01); *C08G 18/10* (2013.01); *C08G 18/246* (2013.01); *C08G 18/3206* (2013.01); *C08G 18/44* (2013.01); *C08G 18/664* (2013.01); *C08G 18/706* (2013.01); *C08G 18/722* (2013.01); *C08G 18/758* (2013.01); *C08G 18/792* (2013.01); *C08G 71/04* (2013.01); *C08K 7/00* (2013.01); *C08K 7/24* (2013.01); *C08L 75/04* (2013.01); *C09D 5/04* (2013.01); *C09J 175/04* (2013.01); *B32B 2250/02* (2013.01); *B32B 2255/10* (2013.01); *B32B 2255/20* (2013.01); *B32B 2255/205* (2013.01); *B32B 2255/26* (2013.01); *B32B 2260/025* (2013.01); *B32B 2260/046* (2013.01); *B32B 2264/0207* (2013.01); *B32B 2264/101* (2013.01); *B32B 2264/105* (2013.01); *B32B 2264/107* (2013.01); *B32B 2264/12* (2013.01); *B32B 2266/025* (2013.01); *B32B 2266/0207* (2013.01); *B32B 2266/0278* (2013.01); *B32B 2266/06* (2013.01); *B32B 2266/08* (2013.01); *B32B 2307/308* (2013.01); *B32B 2307/416* (2013.01); *B32B 2307/50* (2013.01); *B32B 2307/546* (2013.01); *B32B 2307/714* (2013.01); *B32B 2307/734* (2013.01); *B32B 2307/738* (2013.01); *B32B 2451/00* (2013.01); *C08G 2170/20* (2013.01)

(58) Field of Classification Search
USPC ........................................................ 428/195.1
See application file for complete search history.

(56) References Cited

U.S. PATENT DOCUMENTS

| | | | |
|---|---|---|---|
| 5,620,775 A | 4/1997 | LaPerre | |
| 5,959,775 A * | 9/1999 | Joseph | ............... C08G 18/10 |
| | | | 359/538 |
| 5,976,669 A | 11/1999 | Fleming | |
| 6,544,449 B1 * | 4/2003 | Gardner | ............... B60R 13/02 |
| | | | 264/46.5 |
| 8,420,217 B2 | 4/2013 | Johnson | |
| 8,634,146 B2 | 1/2014 | David | |
| 2003/0100637 A1 * | 5/2003 | Mimura | ............... C09B 57/00 |
| | | | 524/89 |
| 2011/0028642 A1 | 2/2011 | Xie | |
| 2011/0281965 A1 * | 11/2011 | Laas | ............... C08G 18/022 |
| | | | 521/137 |
| 2018/0044465 A1 * | 2/2018 | Walker, Jr. | ............... B32B 5/30 |

* cited by examiner

FLEXIBLE MICROSPHERE ARTICLES HAVING HIGH TEMPERATURE STABILITY

CROSS REFERENCE TO RELATED APPLICATIONS

This application is a national stage filing under 35 U.S.C. 371 of PCT/US2015/035726, filed Jun. 15, 2015, which claims the benefit of U.S. Provisional Application No. 62/115,950, filed Feb. 13, 2015, the disclosure of which is incorporated by reference in its entirety herein.

FIELD

This disclosure relates to flexible microsphere articles having high temperature stability.

BACKGROUND

Decorative protective surfaces find many consumer applications. Household appliances, automotive interiors and paints, consumer electronic devices, such as laptops and hand held devices, and apparel, such as clothing and footwear, are all examples where consumers prefer materials that deliver considerable protection from scratches, wear and abrasion while retaining high cosmetics and aesthetics through the material's lifecycle. High quality conformable surfaces that are free of cracks and/or other defects when used in a broad temperature range are of particular interest to many consumers because of their aesthetic appeal.

Durable decorative laminates and films comprised of glass beads are broadly known. These low gloss constructions typically consist of exposed glass bead surfaces that impart high durability and decorative properties to the construction. Low friction properties of such constructions have also been disclosed. For example, U.S. Pat. No. 4,849,265 (Ueda) discloses decorative abrasion resistant laminates that contain hard microspheres (glass or plastic) that are either exposed or surface coated with a thin polymer coating. Another example is U.S. Pat. No. 5,620,775 (LaPerre), which discloses durable, low coefficient of friction polymeric films made by having an exposed glass bead surface with glass. Another example is U.S. Pat. No. 8,420,217 (Johnson) which discloses elastic bonding films that include an elastic, thermoset core layer and a thermoplastic bonding layer on each side of the core layer, where the thermoset core layer is a polyurethane formed as the reaction product of (i) a multifunctional isocyanate with (ii) a combination of polyols comprising (a) polyester diol, (b) crosslinker, and (c) hard segment.

There is a need for flexible microspheres articles having high temperature stability that have a low coefficient of friction, resistant to organic solvents, and are also free of visible defects.

SUMMARY

The present disclosure provides flexible microsphere articles having high temperature stability that have a low coefficient of friction, resistance to organic solvents, and are also free of visible defects. In one aspect, the present disclosure provides the following embodiments:

In one aspect, the present disclosure provides an article comprising: a binder resin layer comprising an aliphatic polyurethane polymer comprising a plurality of soft segments, and a plurality of hard segments, where the soft segments comprise polycarbonate polyol; and a plurality of microspheres partially embedded and adhered to a first major surface of the binder resin layer, where the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C.

In some embodiments, the amount of hard segments is 10 to 90 percent by weight, the amount of soft segments is 10 to 90 percent by weight, and the total amount of the hard and soft segments being at least 80 percent by weight, the weights being based on the weight of the polyurethane polymer. In some embodiments, the change in storage modulus of the article is less than 7 MPa from 25° C. to 175° C. In some embodiments, the change in storage modulus of the article is less than 5 MPa from 25° C. to 175° C.

In some embodiments, the storage modulus of the article at 175° C. is greater than or equal to 0.2 MPa. In some embodiments, the storage modulus of the article at 175° C. is greater than or equal to 0.5 MPa.

In some embodiments, the plurality of microspheres are selected from at least one of glass, polymers, glass ceramics, ceramics, metals and combinations thereof. In some embodiments, at least about 60% of the surface of the article is covered with the plurality of microspheres.

In some embodiments, the article further comprises a second layer disposed along the second major surface of the first binder layer. In some embodiments, the second layer comprises a flexible material.

In some embodiments, the article is resistant to organic solvents. In some embodiments, the article exhibits a coefficient of friction of less than or equal to 0.3. In some embodiments, the article is heat bonded at elevated temperatures to a substrate.

In some embodiments, the soft segments have a number average molecular weight of less than 10,000 g/mol, and the hard segments are derived from diols having molecular weights of less than 500 g/mol. In some embodiments, the soft segments have a number average molecular weight of at least 500 g/mol. In some embodiments, the soft segments have a number average molecular weight of 500 g/mol to 6,000 g/mol. In some embodiments, the soft segments have a number average molecular weight of 500 g/mol to 3,000 g/mol.

In some embodiments, the binder resin layer has a thickness of 50 to 600 micrometers, and includes microspheres having an average diameter of about 30 to 200 micrometers. In some embodiments, the polyurethane polymer contains less than 30 percent by weight hard segments and 15 to 90 percent by weight soft segments. In some embodiments, the total amount of hard and soft segments in the polyurethane polymer is at least 80 percent by weight of the polymer.

In another aspect, the present disclosure provides an article comprising: a binder resin layer comprising an aliphatic polyurethane polymer comprising a plurality of soft segments, and a plurality of hard segments, wherein the soft segments comprise polycarbonate polyol; and a plurality of microspheres partially embedded and adhered to a first major surface of the binder resin layer, wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C., and wherein the article is thermoformable.

In yet another aspect, the present disclosure provides an article comprising: a binder resin layer comprising an aliphatic polyurethane polymer comprising a plurality of soft segments, and a plurality of hard segments, wherein the soft segments comprise polycarbonate polyol; and a plurality of microspheres partially embedded and adhered to a first major surface of the binder resin layer, wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C., and wherein the article passes the Flexibility Testing The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1A:
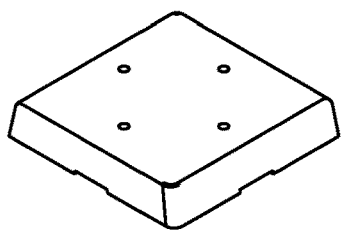
FIG. 1A is a front perspective view of one embodiment of a thermoformable article according to the present disclosure.

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

The term "decorative article" as used herein means articles that have a coefficient of retro reflection of less than or equal to 1.0 candelas/lux/square meter according to the procedure established in Procedure B of ASTM Standard E 809-94a, measured at an entrance angle of −4.0 degrees and an observation angle of 1 degree. In some preferred embodiments, the presently disclosed articles have a coefficient of retro reflection of less than or equal to 0.5 candelas/lux/square meter according to the procedure established in Procedure B of ASTM Standard E 809-94a, measured at an entrance angle of −4.0 degrees and an observation angle of 1 degree. In some more preferred embodiments, the presently disclosed articles have a coefficient of retro reflection of less than or equal to 0.3 candelas/lux/square meter according to the procedure established in Procedure B of ASTM Standard E 809-94a, measured at an entrance angle of −4.0 degrees and an observation angle of 1 degree. In some most preferred embodiments, the presently disclosed articles have a coefficient of retro reflection of less than or equal to 0.1 candelas/lux/square meter according to the procedure established in Procedure B of ASTM Standard E 809-94a, measured at an entrance angle of −4.0 degrees and an observation angle of 1 degree.

The present disclosure provides articles having at least a first surface that includes a first binder layer selected from at least one of linear resins and resins having low cross link densities, where the first binder layer has a first major surface opposite a second major surface; and a plurality of microspheres at least partially embedded in and adhered to the first major surface of the first binder layer. In some embodiments, it is preferred that the article is thermoformable or stretchable. In order for the article to be thermoformable or stretchable, the materials in the article, such as the first binder layer, must have certain properties. An exemplary test method for determining the stretchability is included in the tensile test conducted according to ASTM D882-10. In some embodiments, it is preferable that the article is free of visual defects, such as for example inhomogeneities (bubbles, dark spots, light spots, and the like).

The other criterion for the article to be formable is that it can bear the elongation that occurs during forming or stretching without failing, cracking, or generating other defects. This can be achieved by using materials that have a temperature at which they undergo melt flow and forming near that temperature. In some cases, crosslinked materials that do not flow can be used, but they are more likely to crack during the elongation. To avoid this cracking, the crosslink density should be kept low, as can be indicated by a low storage modulus in the rubbery plateau region. The expected degree of crosslinking can also approximated as the inverse of the average molecular weight per crosslink, which can be calculated based on the components of a material. In addition, in some embodiments forming can be conducted at relatively low temperatures, since as temperatures increase above the glass transition temperature of crosslinked materials, their capacity for elongation begins to decrease.

Transfer Carrier

The transfer coating method of the present disclosure can be used to form the presently disclosed microsphere transfer article from which can be formed the presently disclosed microsphere article. The microsphere article has surprisingly improved aesthetics.

The presently disclosed transfer carrier includes a support layer and a thermoplastic release layer bonded thereto. The thermoplastic release layer of the transfer carrier temporarily partially embeds a plurality of transparent microspheres. The transfer carrier has low adhesion to the plurality of transparent microspheres and to the binder layer in which the opposite sides of the plurality of transparent microspheres are at least partially embedded, so that the transfer carrier can be removed to expose the surface of the plurality of transparent microspheres.

Support Layers

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the presently disclosed transfer article. If the support layer is a thermoplastic layer it should preferably have a melting point above that of the thermoplastic release layer of the transfer carrier. Useful support layers for forming the transfer carrier include but are not limited to those selected from at least one of paper and polymeric films such as biaxially oriented polyethylene terephthalate (PET), polypropylene, polymethylpentene and the like which exhibit good temperature stability and tensile strength so they can undergo processing operations such as bead coating, adhesive coating, drying, printing, and the like.

Thermoplastic Release Layers

Useful thermoplastic release layers for forming the transfer carrier include but are not limited to those selected from at least one of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the binder layer, in addition to the plurality of transparent microspheres.

The thickness of the thermoplastic release layer is chosen according to the microsphere diameter distribution to be coated. The binder layer embedment becomes approximately the mirror image of the transfer carrier embedment. For example, a transparent microsphere which is embedded to about 30% of its diameter in the release layer of the transfer carrier is typically embedded to about 70% of its diameter in the binder layer. To maximize slipperiness and packing density of the plurality of microspheres, it is desirable to control the embedment process so that the upper surface of smaller microspheres and larger microspheres in a given population end up at about the same level after the transfer carrier is removed.

In order to partially embed the plurality of transparent microspheres in the release layer, the release layer should preferably be in a tacky state (either inherently tacky and/or by heating). The plurality of transparent microspheres may be partially embedded, for example, by coating a plurality of transparent microspheres on the thermoplastic release layer of the transfer carrier followed by one of (1)-(3):(1) heating the microsphere coated transfer carrier, (2) applying pressure to the microsphere coated transfer carrier (with, for example, a roller) or (3) heating and applying pressure to the microsphere coated transfer carrier.

For a given thermoplastic release layer, the microsphere embedment process is controlled primarily by temperature, time of heating and thickness of the thermoplastic release layer. As the thermoplastic release layer is melted, the smaller microspheres in any given population will embed at a faster rate and to a greater extent than the larger microspheres because of surface wetting forces. The interface of the thermoplastic release layer with the support layer becomes an embedment bonding surface since the microspheres will sink until they are stopped by the dimensionally stable support layer. For this reason it is preferable that this interface be relatively flat.

The thickness of the thermoplastic release layer should be chosen to prevent encapsulation of most of the smaller diameter microspheres so that they will not be pulled away from the binder layer when the transfer carrier is removed. On the other hand, the thermoplastic release layer must be thick enough so that the larger microspheres in the plurality of transparent microspheres are sufficiently embedded to prevent their loss during subsequent processing operations (such as coating with the binder layer, for example).

Microspheres

Microspheres useful in the present disclosure can be made from a variety of materials, such as glass, polymers, glass ceramics, ceramics, metals and combinations thereof. In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Miss., and glass available under the trade designation "PYREX" from Corning Incorporated, New York, N.Y.

The grinding process yields a wide distribution of glass particle sizes. The glass particles are spheroidized by treating in a heated column to melt the glass into spherical droplets, which are subsequently cooled. Not all the beads are perfect spheres. Some are oblate, some are melted together and some contain small bubbles.

Microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

In some embodiments, microspheres useful in the present disclosure are transparent and have a refractive index of less than about 1.60. In some embodiments, the microspheres are transparent and have a refractive index of less than about 1.55. In some embodiments, the microspheres are transparent and have a refractive index of less than about 1.50. In some embodiments, the microspheres are transparent and have a refractive index of less than about 1.48. In some embodiments, the microspheres are transparent and have a refractive index of less than about 1.46. In some embodiments, the microspheres are transparent and have a refractive index of less than about 1.43. In some embodiments, the microspheres are transparent and have a refractive index of less than about 1.35 or less.

When the article is stretched during a forming process, the relative positions of the microspheres on the surface of the first binder layer will change. It is preferred that the change in position of the microspheres results in substantially uniform spacing. Substantially uniform spacing occurs when the distance between individual microspheres tends to increase as the article is deformed. This is in contrast to a less preferred situation when the distance between clusters of microspheres increases, but individual microspheres tend to remain close to each other. Also, if cracking occurs in the binder layer of an article, then gaps will grow between clusters of microspheres, and substantially uniform spacing will not occur. In some embodiments, the article can be elongated in one direction but not in another such that the microspheres tend to increase in separation in the direction of elongation but not increase in separation in the orthogonal direction. In this case, the resulting microspheres have substantially uniform spacing even though microspheres have relatively high separation in the direction of stretching but low separation in the orthogonal direction. Substantially uniform spacing is identified by observing the average distance between microspheres along any straight line on the surface of the film with a uniform distance between microspheres indicates uniform spacing. The average distance between microspheres when comparing two different lines in different directions on the surface of the film do not need to be similar to have substantially uniform spacing.

While not wishing to be bound by theory, it is believed that when microspheres are randomly applied in a full monolayer on a surface, they naturally have substantially uniform spacing because they are packed reasonably closely. However, if microspheres are randomly applied with lower area coverages, such as between 30% and 50% coverage, then they do not necessarily produce uniform spacing. For example, in some cases, clusters of several microspheres can form either by random or by electrostatic attraction leaving other areas on the surface void of microspheres. By first forming a more densely packed layer of microspheres and subsequently stretching the surface of the article, a more uniform spacing of microspheres can occur compared to a random placement of microspheres.

Particle Sizing

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening. It is desirable to use as broad a size range as possible to control economics and maximize the packing of the microspheres on the binder layer surface. However, some applications may require limiting the microsphere size range to provide a more uniform microsphere coated surface. In some embodiments, a useful range of average microsphere diameters is about 5 micrometer to about 200 micrometer (typically about 35 to about 140 micrometer, preferably about 35 to 90 micrometers, and most preferably about 38 to about 75 micrometers). A small number (0 to 5% by weight based on the total number of microspheres) of smaller and larger microspheres falling outside the 20 to 180 micrometer range can be tolerated. In some embodiments, a multi-modal size distribution of microspheres is useful.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. For the present invention the average cross-sectional diameter can be effectively measured by using the following stack of sieves.

| U.S. Sieve Designation No. Nominal Opening (micrometers). |
| --- |
| 80 180 |
| 100 150 |
| 120 125 |
| 140 106 |
| 170 90 |
| 200 75 |
| 230 63 |
| 270 53 |

| U.S. Sieve Designation No. Nominal Opening (micrometers). |
| --- |
| 325 45 |
| 400 38 |
| 500 25 |
| 635 20 |

Alternately, average diameter can be determined using any commonly known microscopic methods for sizing particles. For example, optical microscopy or scanning electron microscropy, and the like, can be used in combination with any image analysis software. For example, useful software includes that commercially available as free ware under the trade designation "IMAGE J" from NIH, Bethesda, Md.

Adhesion Promoter

In some embodiments, the microspheres are treated with an adhesion promoter such as those selected from at least one of silane coupling agents, titanates, organo-chromium complexes, and the like, to maximize their adhesion to the first binder layer, especially with regard to moisture resistance.

The treatment level for such adhesion promoters is on the order of 50 to 1200 parts by weight adhesion promoter per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the microspheres, followed by drying in a tumbler or auger-fed dryer to prevent the microspheres from sticking together. One skilled in the art would be able to determine how to best treat the microspheres with an adhesion promoter.

Binder Layer

The binder layer (also referred to as the "first binder layer" or the "binder resin layer") is typically an organic polymeric material. It should exhibit good adhesion to the transparent microspheres themselves or to the treated microspheres. It is also possible that an adhesion promoter for the microspheres could be added directly to the binder layer itself as long as it is compatible within the process window for disposing the binder layer on the surfaces of the microspheres. It is important that the binder layer has sufficient release from the thermoplastic release layer of the transfer carrier to allow removal of the transfer carrier from the microspheres, which are embedded on one side in the thermoplastic release layer and on the other side in the first binder layer.

In some embodiments, the polymer matrix composites include nanoparticles in resins, fibers in resins, and the like. Combinations can include any combinations of materials, such as interpenetrating networks, dual cure systems, and the like. In some preferred embodiments, a linear material useful to derive the binder layer is a polyurethane.

In some embodiments, the presently disclosed articles have binder layers that are not crosslinked or are very lightly crosslinked. Lightly crosslinked materials can be useful over highly crosslinked materials when it desirable to produce articles having less elastic recovery energy after being deformed in the forming process. Also, lightly crosslinked materials tend to accommodate higher degrees of elongation before failing compared to highly crosslinked materials. In some embodiments, non-crosslinked materials are preferred to give very high degrees of elongation. In some embodiments, lightly crosslinked materials are useful over non-crosslinked materials to give better resistance to chemicals and resistance to creep and other dimensional instability over time.

In some embodiments, the article includes an elastic layer coupled with a thermoplastic layer that has a relatively low forming temperature. Polycarbonate and polycarbonate blends, thermoplastic polyurethane (TPU), non-crystalline PET such as amorphous PET or PETG are some exemplary thermoplastics.

In some embodiments, the present disclosure provides binder resin systems, including two component (or also referred to herein as "2K") urethanes coated from solvent, 100% solids two component urethanes and two layer urethanes. The binder layer can be formed, for example, out of solution, aqueous dispersion, or 100% solids coating such as via hot melt or extrusion. The binder layer may be transparent, translucent, or opaque. It may be colored or colorless. The binder layer may, for example, be clear and colorless or pigmented with opaque, transparent, or translucent dyes and/or pigments. In some embodiments, inclusion of specialty pigments, such as for example metallic flake pigments, can be useful.

In some embodiments, a binder resin layer useful in the present disclosure includes an aliphatic polyurethane polymer comprising a plurality of soft segments, and a plurality of hard segments. In some embodiments, the soft segments are polycarbonate polyol.

In some embodiments, the specific chemical identities and relative amounts of the hard and soft segments and moieties of the hard and soft segments are sufficient to impart a glass transition temperature of 10° C. or less and a storage modulus that changes 15 MPa or less from 25° C. to 175° C. In some embodiments, the soft segments have a number average molecular weight of less than 10,000 g/mol. In some embodiments, the hard segments are derived from diols having molecular weights of less than 500 g/mol. In some preferred embodiments, the soft segments have a number average molecular weight of less than 10,000 g/mol, and the hard segments are derived from diols having molecular weights of less than 500 g/mol. In some embodiments, the soft segments have a number average molecular weight of at least 500 g/mol. In some preferred embodiments, the soft segments have a number average molecular weight of 500 g/mol to 6,000 g/mol, and more preferably between 500 g/mol to 3,000 g/mol. In some preferred embodiments, the soft segments have a number average molecular weight of 500 g/mol to 6,000 g/mol, and more preferably between 500 g/mol to 3,000 g/mol, and the hard segments are derived from diols having molecular weights of less than 500 g/mol.

In some embodiments, the amount of hard segments is 10 to 90 percent by weight based on the total weight of the composition that comprises the binder resin layer. In some embodiments, the amount of soft segments is 10 to 90 percent by weight based on the total weight of the composition that comprises the binder resin layer. In some embodiments, the total amount of the hard and soft segments is at least 80 percent by weight based on the total weight of the composition that comprises the binder resin layer. In a preferred embodiment, the amount of hard segments is 10 to 90 percent by weight, the amount of soft segments is 10 to 90 percent by weight, and the total amount of the hard and soft segments being at least 80 percent by weight, the weights being based on the total weight of the composition that comprises the binder resin layer. In some embodiments, the composition from which the binder resin layer is derived contains less than 30 percent by weight hard segments and 10 to 90 percent by weight soft segments. In some embodiments, the composition from which the binder resin layer is derived contains a total amount of hard and soft segments in the polyurethane polymer of at least 80 percent by weight of the polymer.

In an even more preferred embodiment, the amount of hard segments is 10 to 90 percent by weight, the amount of soft segments is 10 to 90 percent by weight, and the total amount of the hard and soft segments being at least 80 percent by weight, the weights being based on the weight of a polyurethane polymer from which the binder resin layer is derived. In some embodiments, the polyurethane polymer from which the binder resin layer is derived contains less than 30 percent by weight hard segments and 15 to 90 percent by weight soft segments. In some embodiments, the polyurethane polymer from which the binder resin layer is derived contains a total amount of hard and soft segments in the polyurethane polymer of at least 80 percent by weight of the polymer.

The weight percent of the hard segment is calculated by adding the weight percent of diols having molecular weights of less than 500 g/mol and the weight percent of the isocyanate components.

In some embodiments, the polyurethane polymer has a change in storage modulus of less than 7 MPa from 25° C. to 175° C. In some embodiments, the polyurethane polymer has a change in storage modulus of less than 5 MPa from 25° C. to 175° C. In some embodiments, the resulting binder resin layer has a storage modulus at 175° C. of greater than or equal to 0.2 MPa. In some embodiments, the resulting binder resin layer has a storage modulus at 175° C. of greater than or equal to 0.5 MPa. In some embodiments, the binder resin layer has a storage modulus of at least 0.1 MPa at 175° C., preferably at least 0.25 MPa at 175° C., and most preferably 0.50 MPa at 175° C.

In some embodiments, the binder resin layer has a thickness of 50 to 600 micrometers, and includes microspheres having an average diameter of about 30 to 200 micrometers.

The binder layer is typically formed on the transfer carrier after the transparent microspheres have been partially embedded in the release layer of the transfer carrier. The binder layer is typically coated over the partially embedded transparent microspheres by a direct coating process but could also be provided over the transparent microspheres via thermal lamination either from a separate carrier or by first forming the binder layer on a separate substrate from which it is subsequently transferred to cover the transparent microspheres.

Substrate Layers

The presently disclosed microsphere coated articles and transfer articles can optionally comprise one or more substrate layer(s). Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like; and open-cell foams and closed cell foams, including for example, polyurethane foam, polyethylene foam, foamed rubber, and the like. The substrates may, for example, be in the form of a clothing article or footwear; automobile, marine, or other vehicle seat coverings; automobile, marine, or other vehicle bodies; orthopedic devices; electronic devices, hand held devices, household appliances, and the like.

In the presently disclosed transfer and microsphere coated articles, the plurality of transparent microspheres are typically provided as a continuous layer in some embodiments or as a discontinuous layer in some embodiments. The binder layer is continuous in some embodiments or discontinuous in some embodiments. Typically, the substrate layer, when present, is continuous, although it may be discontinuous. In the presently disclosed microsphere coated articles all layers can optionally be continuous or discontinuous.

In some embodiments, where the article is bonded to a substrate layer, the presently disclosed article can be thermally bonded to various substrates without distortion of or other defects in the article. For example, in some embodiments. The presently disclosed articles can be heat bonded to at least one substrate.

Second Layer

In some embodiments, the presently disclosed articles include a flexible second layer disposed along the second major surface of the binder layer. Non-limiting exemplary flexible materials useful in the second layer in the present disclosure include polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof. In some embodiments, a polymer matrix composites include nanoparticles in resins, fibers in resins, and the like. Combinations can include any combinations of materials, such as interpenetrating networks, dual cure systems, and the like.

Graphic Layer Options

The present disclosed binder layer can optionally also perform the function of acting as an adhesive for a desired substrate and/or further comprise pigment(s) such that it also has a graphic function.

The binder layer, when selected to function also as a substrate adhesive, may be, for example, pigmented and provided in the form of an image, such as, for example, by screen printing the adhesive in the form of a graphic for transfer to a separate substrate. However, the binder layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder layer opposite the plurality of transparent microspheres by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

A colored polymeric layer(s) may be included in the articles of the present disclosure by a number of procedures. For example, a transfer carrier can have a layer of transparent microspheres embedded in the release layer thereof, following which the microsphere embedded surface of the release layer is coated with a transparent layer of binder. This microsphere and adhesive coated transfer carrier can function as a casting liner by coating, for example, a continuous colored plasticized vinyl layer over the binder layer and wet laminating a woven or non-woven fabric thereover.

Another method involves providing graphic layers (discontinuous colored polymeric layers, for example) on the binder layer prior to casting a continuous colored plasticized vinyl layer to approximate the image of leather, for example.

Optional Adhesive Layer(s)

The presently disclosed microsphere coated article and transfer article may each optionally further comprise one or more adhesive layers in addition to the binder layer. A substrate adhesive layer, for example, may optionally be included in the article in order to provide a means for bonding the binder layer or the layer(s) of material optionally bonded to the binder layers to a substrate. These optional adhesive layer(s) may be optionally present when, for example, the binder layer cannot function also as an adhesive for a desired substrate. A substrate adhesive layer (as well as any other optional adhesive layers) may comprise the same general types of polymeric materials used for the binder layer and may be applied following the same general procedures. However, each adhesive layer used must be selected such that it will adhere the desired layers together. For example, a substrate adhesive layer must be selected such that it can adhere to an intended substrate as well as to the other layer to which it is bonded. The substrate adhesive layer, when present, may be continuous in some embodiments or discontinuous in some embodiments.

Adhesives useful in the presently disclosed adhesive layer(s) include polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Reinforcing Layer(s)

Optional layers may be included in the presently disclosed microsphere coated article and transfer article to, for example, enhance the ability to separate the transfer carrier from the layer of a plurality of transparent microsphere. Such an optional layer which in such an article can function as a reinforcing layer would typically be positioned in between the plurality of transparent microspheres and a substrate adhesive layer. Examples of useful reinforcing layers would include additional substrate layer(s), for example.

A transparent microsphere coated and adhesive coated transfer carrier could be coated with a fabric adhesive such as a polyester, or a polyamide, followed by lamination to a woven fabric or to a moisture transmitting membrane, to function as a slippery liner for clothing, for example.

Embossing

The articles of the present disclosure may optionally be embossed. The embossing procedure would typically involve subjecting the article, bonded to an embossable substrate, and with the transfer carrier removed, to heat and pressure such as by a heated patterned roller assembly or a patterned heated platen press. For embossed articles, it is preferable that the binder layer not be melted during the embossing operation, to preserve the microsphere embedment level, while at the same time being flexible enough to be deformed without cracking. Another method of embossing would be to thermally laminate the transfer article to an irregular substrate such as, for example, a coarse fabric such that after the transfer carrier is removed the surface is conformed to the irregular layer below it. In some embodiments, thermoforming can be used when processing the presently disclosed articles and transfer articles.

For some applications, it can be desirable to obtain specific bead surface area coverages. In some embodiments, at least about 40% of the surface of the article is covered with the plurality of microspheres. In some embodiments, at least about 60% of the surface of the article is covered with the plurality of microspheres. In some embodiments, the article has at least a portion of a first major surface covered with the plurality of microspheres with coverage greater than or equal to 30% of that portion of the first major surface. In some embodiments, the article has at least a portion of a first major surface covered with the plurality of microspheres with coverage less than or equal to 50% of that portion of the first major surface. In some embodiments, the percent of area covered by microspheres in one area of the film can be one coverage density, such as about 71%. In some embodiments, the percent of area covered by microspheres in another area of the film can be the same or different coverage density, such as 47%. In some embodiments, the percent of area covered by microspheres in yet another area of the film can be the same or different coverage density, such as 44%. In some embodiments, the presently disclosed articles include a plurality of microspheres that are substantially uniformly spaced.

The articles of the present disclosure are also preferably resistant to solvents. For example, articles made according to the present disclosure having less than 10% microsphere loss from a surface that is exposed to a solvent, such as methyl ethyl ketone, according to the Solvent Resistant Testing disclosure included below, are considered to be resistant to solvents. In some embodiments, it is particularly preferable that the presently disclosed articles are resistant to organic solvents.

In some embodiments, the presently disclosed articles have a coefficient of friction of less than or equal to 0.3. In some preferred embodiments, the presently disclosed articles have a coefficient of friction of less than or equal to 0.2.

In some embodiments, the article has a change in storage modulus of less than 7 MPa from 25° C. to 175° C. In some embodiments, the article has a change in storage modulus of less than 5 MPa from 25° C. to 175° C. In some embodiments, the article has a storage modulus at 175° C. of greater than or equal to 0.2 MPa. In some embodiments, the article has a storage modulus at 175° C. of greater than or equal to 0.5 MPa. In some embodiments, the article has a storage modulus of at least 0.1 MPa at 175° C., preferably at least 0.25 MPa at 175° C., and most preferably 0.50 MPa at 175° C.

A non-limiting list of exemplary embodiments and combinations of exemplary embodiments of the present disclosure are disclosed below:

Embodiment 1. An article comprising:
 (a) a binder resin layer comprising an aliphatic polyurethane polymer comprising a plurality of soft segments, and a plurality of hard segments, wherein the soft segments comprise polycarbonate polyol; and
 (b) a plurality of microspheres partially embedded and adhered to a first major surface of the binder resin layer,
 wherein the specific chemical identities and relative amounts of the segments and moieties of the aliphatic polyurethane polymer are sufficient to impart a glass transition temperature of 10° C. or less in the article and a storage modulus in the article that changes 15 MPa or less from 25° C. to 175° C.

Embodiment 2. The article of Embodiment 1 wherein the amount of hard segments is 10 to 90 percent by weight, the amount of soft segments is 10 to 90 percent by weight, and the total amount of the hard and soft segments being at least 80 percent by weight, the weights being based on the weight of the polyurethane polymer.

Embodiment 3. The article of Embodiments 1 or 2 wherein the change in storage modulus is less than 7 MPa from 25° C. to 175° C.

Embodiment 4. The article of Embodiments 1 or 2, wherein the change in storage modulus is less than 5 MPa from 25° C. to 175° C.

Embodiment 5. The article of any of the preceding embodiments wherein the storage modulus at 175° C. is greater than or equal to 0.2 MPa.

Embodiment 6. The article of any of the preceding embodiments wherein the storage modulus at 175° C. is greater than or equal to 0.5 MPa.

Embodiment 7. The article of any of the preceding embodiments wherein the plurality of microspheres are selected from at least one of glass, polymers, glass ceramics, ceramics, metals and combinations thereof.

Embodiment 8. The article of any of the preceding embodiments wherein at least about 60% of the surface of the article is covered with the plurality of microspheres.

Embodiment 9. The article of any of the preceding embodiments further comprising a second layer disposed along the second major surface of the first binder layer.

Embodiment 10. The article of Embodiment 6 wherein the second layer comprises a flexible material.

Embodiment 11. The article of any of the preceding embodiments wherein the article is resistant to organic solvents.

Embodiment 12. The article of any of the preceding embodiments wherein the article exhibits a coefficient of friction of less than or equal to 0.3.

Embodiment 13. The article of any of the preceding embodiments wherein the article is heat bonded at elevated temperatures to a substrate.

Embodiment 14. The article of any of the preceding embodiments wherein the soft segments have a number average molecular weight of less than 10,000 g/mol, and wherein the hard segments are derived from diols having molecular weights of less than 500 g/mol.

Embodiment 15. The article of any of the preceding embodiments wherein the soft segments have a number average molecular weight of at least 500 g/mol.

Embodiment 16. The article of any of Embodiments 1 to 13 wherein the soft segments have a number average molecular weight of 500 g/mol to 6,000 g/mol.

Embodiment 17. The article of any of Embodiments 1 to 13 wherein the soft segments have a number average molecular weight of 500 g/mol to 3,000 g/mol.

Embodiment 18. The article of any of the preceding embodiments wherein the binder resin layer has a thickness of 50 to 600 micrometers, and includes microspheres having an average diameter of about 30 to 200 micrometers.

Embodiment 19. The article of Embodiment 1 wherein the polyurethane polymer contains less than 30 percent by weight hard segments and 15 to 90 percent by weight soft segments.

Embodiment 20. The article of any of the preceding embodiments wherein the total amount of hard and soft segments in the polyurethane polymer is at least 80 percent by weight of the polymer.

Embodiment 21. An article comprising:
(a) a binder resin layer comprising an aliphatic polyurethane polymer comprising a plurality of soft segments, and a plurality of hard segments, wherein the soft segments comprise polycarbonate polyol; and
(b) a plurality of microspheres partially embedded and adhered to a first major surface of the binder resin layer,
wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C., and
wherein the article is thermoformable.

Embodiment 22. An article comprising:
(a) a binder resin layer comprising an aliphatic polyurethane polymer comprising a plurality of soft segments, and a plurality of hard segments, wherein the soft segments comprise polycarbonate polyol; and
(b) a plurality of microspheres partially embedded and adhered to a first major surface of the binder resin layer,
wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C., and wherein the article passes the Flexibility Testing Various modifications and alterations of this invention will become apparent to those skilled in the art without departing from the scope and spirit of this invention.

EXAMPLES

Materials

| Designation | Description |
| --- | --- |
| N3300A | A solvent free, polyfunctional, aliphatic isocyanate resin based on hexamethylene diisocyanate (HDI) having an equivalent weight of approximately 193, an NCO content of 21.8%, and a monomeric HDI content of 0.2% maximum, available under the trade designation DESMODUR N3300A from Bayer Materials Science LLC, Pittsburgh, PA. |
| DESMODUR W | A liquid cycloaliphatic diisocyanate, dicyclohexylmethane diisocyanate, having an equivalent weight of 132 maximum, an NCO content of 31.8% minimum, and a solidification point of 25° C., available under the trade designation DESMODUR W from Bayer Materials Science LLC, Pittsburgh, PA. |
| MPD | 3-methyl-1,5 pentanediol, available under the trade designation MPD from Kuraray America, New York, NY. |
| C1090 | A polycarbonate polyol based on MPD and 1,6 hexanediol with a molecular weight of 1000 and an OH value of 112, available under the trade designation C1090 from Kuraray America, New York, NY. |
| C2090 | A polycarbonate polyol based on MPD and 1,6 hexanediol with a molecular weight of 2000 and an OH value of 56, available under the trade designation C2090 from Kuraray America, New York, NY. |
| T12 | dibutyltin dilaurate (DBTDL), a liquid catalyst, available under the trade designation DABCO T-12 from Air Products and Chemicals Inc., Allentown, PA. |
| Borosilicate glass powder | Milled borosilicate glass powder having a size distribution of less than 200 mesh and density of 2.23 grams/cubic centimeter, available as PYREX ® 7740 from Strategic Materials Incorporated, Houston TX. |
| Soda lime silicate microsphere beads | Silane treated soda lime silicate microsphere beads having an average size in the range of 44-53 micrometers, a refractive index of 1.52 as determined by the standard Becke line method, and a density of 2.52 grams/cubic centimeter, obtained from Swarco Industries, Incorporated, Columbia, TN. |

-continued

| Designation | Description |
| --- | --- |
| A1100 | Gamma-aminopropyltrimethoxysilane, a clear liquid coupling agent, available under the trade designation SILQUEST A1100 from Momentive Performance Materials Incorporated, Columbus, OH. |
| GF40 | 3-isocyanatopropyltrimethoxysilane, having a molecular weight of 205 grams/mole, available under the trade designation GENIOSIL GF 40, Wacker Chemie AG, Munich, Germany. |
| PCPBT | Polycarbonate/Polyester Blend Film commercially available under the trade designation BAYFOL CR 6-2 000000 from Bayer Material Science Deerfield MA. Prior to use this was plasma treated generally as described in U.S. Pat. No. 8,634,146 at column 13, line 65 to column 14, line 30, with the following modifications. The width of the drum electrode was 108 centimeters (42.5 inches); the tetramethyl silane deposition step was not employed; during the treatment step 1000 standard cubic centimeters of nitrogen was used in place of oxygen, and the operating pressure was 90 milliTorr, and a plasma treatment time of 30 seconds. |
| U42 | An aqueous anionic dispersion of a high molecular weight polyurethane, approximately 50% solids in water, available under the trade designation DISPERCOLL U42 from Bayer MaterialScience LLC, Pittsburgh, PA. |
| RM-8W | A nonionic urethane rheology modifier, based on hydrophobically modified polyethylene oxide urethane, having an active solids content of 17.5 wt % and a total solids content of 21.5 wt % (including solvent-free proprietary viscosity suppressant), available under the trade designation ACRYSOL RM-8W from Dow Chemical Company, Midland, MI. |
| BAYHYDUR 302 | A solvent-free, water-dispersible, pale yellow liquid polyisocyanate based on hexamethylene diisocyanate (HDI), having an average equivalent weight of 243, available under the trade designation BAYHYDUR 302 from Bayer MaterialScience LLC, Pittsburgh, PA. |
| TPU | A translucent, polyester thermoplastic polyurethane (TPU) hot melt adhesive having a nominal thickness of 0.10 millimeters (0.004 inches), a Shore A Hardness of 70, a melting point of 86° C. (187° F.) and a glass transition temperature (Tg) of −30° C. (−20° F.), available under the trade designation ESTANE UB 410B TPU from Lubrizol Advanced Materials, Cleveland, OH. |

Test Methods

Flexibility Testing

Except where noted, free-standing bead films having thicknesses ranging from 0.25 to 0.55 millimeters (0.0098 to 0.022 inches) were evaluated for their ability to be repeatedly flexed according to ASTM D6182-00. A pass indicates the sample performed 100,000 flex cycles with no visible damage. Samples were tested at least three days after preparation.

Dynamic Mechanical Test (DMA)

Free-standing films having thicknesses ranging from 0.25 to 0.55 millimeters (0.0098 to 0.0217 inches) were evaluated for their storage modulus (E') at room temperature (approximately 25° C.) and glass transition temperature ($T_g$) using a dynamic mechanical analyzer (Model Q800 DMA, TA Instruments, New Castle, Del.) with a tensile grip separation distance of between 14.9 millimeters and 21.0 millimeters (0.59 to 0.83 inches), and a temperature ramp rate of 2.5° C./minute. The film samples had a width of 6.0 millimeters to 6.4 millimeters (0.24 to 0.25 inches). Samples were run at a frequency of 1.0 Hz through a temperature sweep starting at −50° C. (−58° F.) up to 200° C. (392° F.) or until they yielded or broke. For each example evaluated one sample was run. It was desirable for samples to have a measurable DMA value at 175° C. (257° F.), for example, at least 0.20 MPa.

Retroreflectivity Test

Measurements of the coefficient of retroreflection (Ra) were made directly on the beaded surface of various constructions according to the procedure established in Procedure B of ASTM Standard E 809-94a, measured at an entrance angle of −4.0 degrees and an observation angle of 1 degree. The photometer used for those measurements is described in U.S. Defensive Publication No. T987,003. Ra was reported in Candelas/square meter/lux. Retroreflective articles typically exhibit a coefficient of retroreflection of more than 2.

Coefficient of Friction Testing

Free-standing bead film samples were evaluated for coefficient of friction using a table top peel tester. A 3.2 millimeters (0.013 inch) thick elastomeric foam having a density of about 0.25 g/cc was bonded to a flat steel substrate measuring 63.5 millimeters (2.5 inches) square, having a thickness of about 6 millimeters (0.024 inches), and weighing approximately 200 grams including the foam. Next, a free-standing bead film having a length of 63.5 millimeters (2.5 inches) that was approximately 5 millimeters longer than the substrate was place over the foam covered surface of the substrate such that the film was wrapped around the leading edge of the substrate. A hole was cut in the film to accommodate the pin by which the substrate was pulled during testing. This test article was placed with the film side down on an isopropyl alcohol wiped glass surface measuring at least 15.2 centimeters by 25.4 centimeters (6 inches by 10 inches). A table top peel tester was used in the coefficient of friction mode to pull the test article across the glass surface at a rate of about 2.29 meters/minute (90 inches/minute) for at least about 5 seconds. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate of ten readings/ second and the average was recorded. Three samples were run for each film and the average of these three coefficient of friction measurements was reported. Values of 0.3 or less are desirable.

Solvent Resistance Testing

Except where noted, free-standing bead films were evaluated for solvent resistance as described in ASTM D5402-06 (2011) Method A using the following parameters. The solvent was MEK (methyl ethyl ketone). A cheesecloth was used. The sample size was 5.1 by 2.5 centimeters (2 inches by 1 inch). An area in approximately the middle of the tested samples was evaluated under with a microscope at 100× using reflected light. The area rubbed with solvent was inspected for loss of beads. If 10% or less of the beads were observed to be missing the sample was rated "Pass". If more than 10% of the beads were observed to be missing the sample was rated "Fail".

Method for Making Bead Film Transfer Article

Borosilicate Bead Carrier

Borosilicate glass powder was flame treated by passing it through a hydrogen/oxygen flame at a rate of 3 grams/minute two times, then collected in a stainless steel container whereupon metallic impurities were removed using a magnet. The resulting glass microsphere beads were treated with 600 ppm of A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and which were free flowing. The resulting transparent silane treated microspheres were cascade coated using a mechanical sifter onto a transfer carrier comprising a polyethylene coated polyester film liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Soda Lime Silicate Bead Carrier

Soda lime silicate microsphere beads were used as received to prepare a bead carrier in the following manner. The glass microsphere beads were treated with 600 ppm of A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and which were free flowing. The resulting transparent silane treated microspheres were cascade coated using a mechanical sifter onto a transfer carrier comprising a polyethylene coated polyester film liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

The polycarbonate polyols used in the examples were viscous at higher molecular weights and had limited miscibility with lower molecular weight polyols such as 1,4-butanediol and MPD. Therefore the polyol mixtures were often prepared as premixes using heating and rolling to assess miscibility at elevated temperatures as well as after cooling to room temperature. It was advantageous to have miscible systems to avoid macro phase separation prior to coating.

Methods for Providing Thermoformed Articles

Method A

Figure 1B:
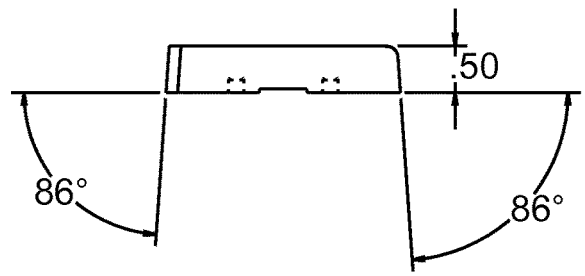
FIG. 1B is a side cross section view of one embodiment of a thermoformable article according to the present disclosure.
Figure 1C:
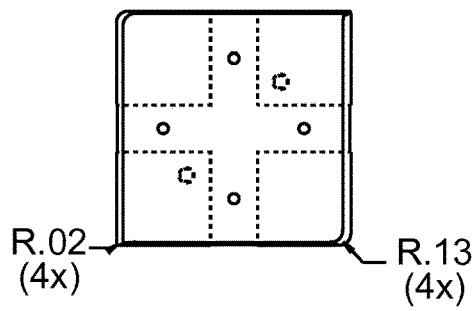
FIG. 1C is a top plan view of one embodiment of a thermoformable article according to the present disclosure.
Figure 1D:
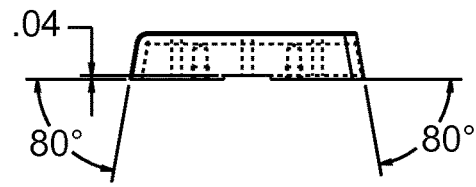
FIG. 1D is a side cross section view of one embodiment of a thermoformable article according to the present disclosure.
Figure 1E:
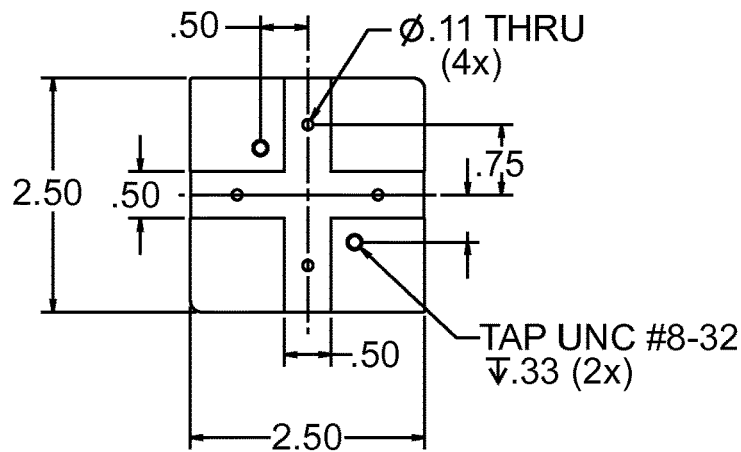
FIG. 1E is a top plan view of one embodiment of a thermoformable article according to the present disclosure.

Thermoformed free-standing bead film laminate articles were prepared from the free-standing bead film laminates as follows. A sample of the film laminate, measuring 20.3 centimeters (8 inches) square, was thermoformed using a COMET thermoformer (model C53SPT, MAAC Machinery Corporation, Carol Stream, Ill.). The thermoformer was run using a standard vacuum forming process with the top oven moving with the laminate to the forming station to maintain film temperature during transit. A male test mold having a 6.35 centimeters (2.50 inches) square base, a height of 1.27 centimeters (0.5 inches), and various radii and draft angles to its vertical sides was used to form the films (see FIGS. 1A-E). The thermoforming parameters are shown in Table 3. The sheet temperature just before molding was measured using a hard mounted non-contact (infrared) thermometer, (Raytek Miniature Infrared Sensor, available from Raytek, Santa Cruz, Calif.). The results of the thermoforming trials were recorded as "Pass" (no cracking was visually observed, by unaided eye, after thermoforming) or "Fail" (cracking was visually observed, by unaided eye, near the base of the molded shape after thermoforming).

Method B

Thermoforming was carried out using a dual vacuum thermoforming apparatus (Model NGF-0409-T, available from FVF Fu-se Vacuum Forming Limited, Habikino, Japan). A transparent, polycarbonate protective hard case for a mobile device, measuring 12.6 centimeters by 6.1 centimeters by 0.90 centimeters (5.0 inches by 2.4 inches by 0.35 inches) was placed on a shaped jig designed to elevate the case away from the flat surface it rested on. The jig/case assembly was placed on the carriage table of the apparatus. The film to be formed onto the case was attached, by means of 3M 8403 Green Polyester Film Tape (3M Company, Saint Paul, Minn.), to the top surface of a frame that was positioned above the carriage and which had an open area circumscribed by the frame. The carriage with jig/case assembly and the frame with film were then loaded into the vacuum chamber of the apparatus and locked in place. The upper half of the chamber was lowered creating two air tight spaces with the film between them. The air pressure in both the upper and lower chambers was decreased to create a vacuum of between 0 and 1 kPa (0 and 0.15 pounds/square inch). Next, infrared heaters were used to raise the temperature of the film to 120° C. (248° F.) as measured at the film surface using a laser pyrometer. When the film reached temperature, the carriage table was raised to bring the jig/case assembly up through the opening in the frame and into intimate contact with the film attached to the frame. The pressure in the upper half of the chamber was simultaneously raised to 300 kPa (43.5 pounds/square inch) using compressed air. After the thermoforming operation was complete the upper and lower chamber pressures were brought to atmospheric pressure, the chamber was opened, and the assembly having a film thermoformed around the case was removed. The total cycle time of the process was between 50 and 80 seconds. The samples were reported as "Pass" if no cracking was visually observed near the base of the molded shape after thermoforming, by unaided eye, after thermoforming, or "Fail" if cracking was visually observed near the base of the molded shape after thermoforming, by unaided eye after thermoforming.

Premix 1

95 grams of C2090 and 5 grams of MPD were added to a 250 ml jar, which was placed in an oven at 70° C. for 12 hours, after which time the jar was placed on a mechanical roller for 6 hours. This heating and rolling process was repeated as follows to give a clear, homogenous mixture: 1 hour at 70° C., 1 hour on roller, 1 hour at 70° C., allowed to cool on a benchtop. The jar was warmed to 70° C. and the contents were observed to be clear and homogeneous. The jar was cooled to room temperature and the contents remained clear and homogeneous.

Premix 2

20 grams of C1090, 75 grams C2090, and 5 grams of MPD were added to a 250 ml jar and the jar was heated and mixed in the same manner as in premix 1. The contents were clear after the last heating step and stayed clear upon cooling to room temperature.

Premix 3

89 grams of C2090 and 11 grams of MPD were added to a 250 ml jar and the jar was heated and mixed in the same manner as in premix 1. The contents were clear after the last heating step but became hazy upon cooling to room temperature.

Premix 4

99 grams of C2090 and 1 gram of MPD were added to a 250 ml jar and the jar was heated and mixed in the same manner as in premix 1. The contents were clear after the last heating step and stayed clear upon cooling to room temperature.

Example 1

A 100% solids two-part polyurethane was prepared by adding the following vacuum degassed materials to a MAX 60 Speedmixer cup (FlackTek Inc, Landrum, S.C.): 12.04 grams of a 85:15 (w/w) blend of DESMODUR W with N3300A, 46.14 grams of Premix 1 (C2090:MPD/95:5, w/w). Vacuum was applied directly to the cup for 15 seconds and then mixed at 2600 rpm for 45 seconds under full vacuum in a DAC 150.1 FVZ-K Speedmixer (FlackTek Inc, Landrum, S.C.). The mixture was then removed from the Speedmixer and 52 microliters T12 was added using a micropipette. The cup was again placed under vacuum for 15 seconds and mixed for an additional 45 seconds at 2600 rpm under full vacuum. The resulting mixture was applied between a polyethylene coated polyester film release liner and Borosilicate bead carrier, both measuring 30.5 centimeters (12 inches) wide, using a notchbar coater having a gap setting of 0.30 millimeters (0.012 inches) greater than the combined thickness of the release liners and bead carrier at a rate of about 3.0 meters/minute (10 feet/minute). The coated precursor was cured at room temperature for 2 hours then in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.). A transfer laminate article having borosilicate beads which were partially embedded in polyethylene on one side and in the polycarbonate-based polyurethane resin on the other side was obtained. Removal of the liners provided a free-standing polycarbonate-based polyurethane bead film having a thickness of 0.43 millimeters (0.017 inches). Retroreflectivity was measured as 0.07 Candelas/square meter/lux according to the Retroreflectivity Test.

Examples 2-7 and Comparative Examples 1-3

The compositions of the examples shown in Table 1 below were prepared in the same manner as described for Example 1 above to provide free-standing polycarbonate-based polyurethane bead films with the following modifications. Example 5 used a soda lime bead carrier. Example 4 included GF 40 at 1% based on the combined weight of isocyanates and polyols; and Comparative Example 3 included 3% of GF 40 calculated in the same manner. In addition, Example 4 and Comparative Example 3 were cured for an additional 22 hours at 80° C. (176° F.) after the fifth stage of thermal curing described in Example 1.

Example 8A

A 100% solids two-part polyurethane was prepared as described in Example 1 with the following modifications. 27.4 grams of a mixture of C2090:MPD/95:5 (w/w) was prepared just prior to by means of the FlackTek Speedmixer for 30 seconds at 600 rpm under vacuum. Next, 0.70 grams of N3300A, 6.30 grams DESMODUR W, 0.08 grams GF 40, and 31 microliters T12 were then added to the polyol mixture and the combination mixed an additional 45 seconds at 2600 rpm under full vacuum. The resulting mixture was coated and cured as described in Example 1, except the first stage time was 180 minutes.

A transfer laminate article was obtained, where the article had borosilicate beads that were partially embedded in polyethylene on one side and in the polycarbonate-based polyurethane resin on the other side. Removal of the liners provided a free-standing polycarbonate-based polyurethane bead film having a thickness of 0.58 millimeters (0.023 inches), which was evaluated for various properties. The results are shown in Table 2.

Example 8B

Example 8A was repeated with the following two modifications—the notchbar coater gap setting was 0.05 millimeters (0.002 inches) and the free-standing polycarbonate-based polyurethane bead film had a thickness of 0.21 millimeters (0.008 inches). This was provided with a heat activated adhesive on the exposed surface of the polyurethane resin layer after removing the polyethylene coated polyester release liner from it. A heat activated adhesive was provided as follows. To a glass jar were added 500 grams of U42 and 5 grams of RM-8W. The jar was sealed shut and place on a roller mixer for 2 hours at room temperature. Just prior to use, 3.0 grams of BAYHYDUR 302 was added to 100 grams of U42/RM-8W solution and mixed for one minute at 3000 rpm using a FlackTek Speedmixer to give an adhesive solution. This solution was coated onto the side of the polycarbonate-based polyurethane resin opposite the side having the beads. A knife coater having a gap setting of 0.13 millimeters (0.005 inches) greater than the thickness of the transfer laminate article after removal of the polyethylene coated polyester release liner was used, the coating rate was about 3.0 meters/minute (10 feet/minute), and drying was done at 60° C. for 30 minutes. Removal of the bead carrier liner gave a free-standing polycarbonate-based polyurethane bead film having embedded borosilicate beads on one side and a heat activated adhesive on the other side.

Example 9

A sample of Example 2 was used to prepare a fabric laminate as follows. A sample of Example 2 was laminated to tricot knit cloth using TPU hot melt adhesive. An air operated, automatic Digital Combo DC16AP 14×16 heat press (GeoKnight & Company Incorporated, Brockton, Mass.) having a 15.2 centimeter by 20.3 centimeter (6 inch by 8 inch) plate set up was used to bond the exposed surface of the TPU to the exposed surface of the sample of Example 2. The bottom plate temperature was set at 93° C. (200° F.) and top plate temperature was set at 121° C. (250° F.). The plates were brought together multiple times in different areas at a pressure of 41.4 Pascals (60 pounds/square inch) for 30 seconds to ensure good adhesion. After cooling, the release liner covering the exposed surface of the TPU was removed and the exposed TPU surface was joined to the exposed surface of a tricot knit cloth (94% polyester/6% nylon, available from Apex Mills Corporation, Inwood, N.Y.). This layup was heat bonded using multiple applications of pressure as described above. A beaded fabric laminate having, from top to bottom, a polyurethane first layer uniformly coated on its outer, exposed side with partially embedded borosilicate microsphere beads and on the other side with TPU bonding layer, and a tricot knit cloth was obtained.

TABLE 1

Compositions

| Ex. | DESMO DUR W (grams) | N3300 (grams) | Isocyanate Ratio (w:w) | C1090 (grams) | C2090 (grams) | MPD (grams) | Polyol Ratio (w:w) | NCO:OH Index | T12 (microliters) | GF40 (grams) | Premix |
|---|---|---|---|---|---|---|---|---|---|---|---|
| 1 | 10.23 | 1.81 | 85:15 | | 43.83 | 2.31 | 95:5 | 1.05 | 52 | | 1 |
| 2 | 10.87 | 1.21 | 90:10 | | 44.57 | 2.35 | 95:5 | 1.05 | 56 | | 1 |
| 3 | 3.20 | 0.80 | 80:20 | | 23.20 | 0.23 | 99:1 | 1.05 | 24 | | 4 |
| 4 | 5.10 | 0.90 | 85:15 | | 21.99 | 1.16 | 95:5 | 1.05 | 25 | 0.29 | 1 |
| 5 | 7.20 | 1.80 | 80:20 | 6.12 | 22.96 | 1.53 | 20:75:5 | 1.05 | 35 | | 2 |
| 6 | 5.13 | 0.42 | 92.5:7.5 | | 20.81 | 1.10 | 95:5 | 1.05 | 24 | | 1 |
| 7 | 5.25 | 0.75 | 87.5:12.5 | | 22.10 | 1.16 | 95:5 | 1.05 | 26 | | 1 |
| 8A | 6.30 | 0.70 | 90:10 | | 26.03 | 1.37 | 95:5 | 1.05 | 31 | 0.08 | 1 |
| C1 | 6.41 | 1.60 | 80:20 | | 17.58 | 2.17 | 89:11 | 1.05 | 25 | | 3 |
| C2 | 7.60 | 0.40 | 95:5 | | 18.46 | 2.28 | 89:11 | 1.05 | 26 | | 3 |
| C3 | 5.12 | 0.90 | 85:15 | | 21.84 | 1.15 | 95:5 | 1.05 | 25 | 0.87 | 1 |

Properties of the free-standing polycarbonate-based polyurethane films are summarized in Table 2.

TABLE 2

Test Results

| Ex. | Carrier | Free Film Thickness (millimeter) | Tg (DMA) (° C.) | E' @ 25° C. (DMA) (MPa) | E' @ 175° C. (DMA) (MPa) | Delta E' | Flex Test | COF | Solvent Resistance |
|---|---|---|---|---|---|---|---|---|---|
| 1 | Borosilicate | 0.43 | −3.6 | 6.92 | 0.93 | 5.99 | Pass | 0.294 | Pass |
| 2 | Borosilicate | 0.50 | −3.2 | 6.41 | 0.58 | 5.83 | Pass | 0.188 | Pass |
| 3 | Borosilicate | 0.43 | −12.3 | 2.79 | 1.79 | 1.00 | Pass | 0.209 | Pass |
| 4 | Borosilicate | 0.46 | −1.2 | 3.19 | 0.68 | 2.51 | Pass | 0.237 | Pass |
| 5 | Soda lime silicate | 0.39 | 0.0 | 7.00 | 1.38 | 5.62 | Pass | 0.223 | Pass |
| 6 | Borosilicate | 0.36 | −1.4 | 9.78 | 0.54 | 9.24 | Pass | 0.205 | Pass |
| 7 | Borosilicate | 0.42 | −2.9 | 5.00 | 1.56 | 3.44 | Pass | 0.205 | Pass |
| 8A | Borosilicate | 0.58 | −1.0 | 4.47 | 0.20 | 4.27 | Pass | 0.284 | Pass |
| 9 | Borosilicate | N.D. | N.D. | N.D. | N.D. | N.D. | Pass | 0.211 | N.D. |
| CE 1 | Borosilicate | 0.54 | 20.0 | 32.3 | 0.84 | 31.5 | Fail | 0.174 | Pass |
| CE 2 | Borosilicate | 0.38 | 25.0 | 48.0 | ca. 0.1 | 47.9 | Fail | 0.171 | Pass |
| CE 3 | Borosilicate | 0.47 | −6.2 | 2.09 | * | * | Pass | 0.248 | Pass |

N.D.: Not Determined
* Broke at 153° C.

Example 10

Example 2 was repeated with the following modifications: a 0.18 millimeters (0.007 inches) PCPBT film was used in place of the polyethylene coated polyester film liner; and a gap setting of 0.076 millimeters (0.003 inches) greater than the combined thickness of the release liner and bead carrier was employed. A polycarbonate-based polyurethane bead film laminate having a PCPBT substrate film was thereby provided.

Examples 11 and 12, and Comparative Examples 4 and 5

Examples 6 and 7, and Comparative Examples 1 and 2 were repeated with the same modifications as described in Example 10 to provide polycarbonate-based polyurethane bead film laminates having a PCPBT substrate film.

Thermoformed Articles

Examples 10-12 and Comparative Examples 4 and 5 were used to provide thermoformed articles as described in "Methods for Providing Thermoformed Articles—Method A" above. The thermoforming parameters used to create the three dimensional article shown in FIGS. 1A to 1E are shown in Table 3. The results are shown in Table 4, along with film thickness.

TABLE 3

Thermoforming Parameters

| Parameter | Ex. 10 | Ex. 11 | Ex. 12 | Compar. Ex. 4 | Compar. Ex. 5 |
|---|---|---|---|---|---|
| Upper Radiant Oven Master Output (%) | | | 55 | | |
| Lower Radiant Oven Master Output (%) | | | 55 | | |
| Upper Radiant Oven Compensation (%) | | | −35 | | |
| Lower Radiant Oven Compensation (%) | | | −45 | | |
| Bead Film Laminate Preheat Time (seconds) | | | 6 | | |
| Oven Door Position | | | Closed | | |
| Vacuum | | | 0.76 milliTorr (30 inches Hg) | | |
| Oven Return Delay (seconds) | | | 5 | | |
| Measured Sheet Temperature Immediately Before Thermoforming (° C.) (° F.) | 165 (330) | 162 (324) | 162 (324) | 162 (324) | 167 (333) |
| Mold Temperature (° C.) (° F.) | | | 126 (260) | | |

TABLE 4

Thermoforming Results

| Ex. | Thickness Before Thermoforming (millimeters) | Result |
| --- | --- | --- |
| 10 | 0.38 | Pass |
| 11 | 0.41 | Pass |
| 12 | 0.42 | Fail |
| CE 4 | 0.38 | Fail |
| CE 5 | 0.46 | Pass |

Example 13

Example 8B was used to provide a thermoformed article as described in "Methods for Providing Thermoformed Articles—Method B" above. No cracking was visually observed, by unaided eye, after thermoforming.

Useful polycarbonate polyol-based polyurethane compositions may be used to provide bead films that exhibit desirable high temperature stability as measured by DMA values at 175° C., and flexibility. In addition, some of these useful bead films are also thermoformable.

What is claimed is:

1. An article comprising:
   (a) a binder resin layer comprising an aliphatic polyurethane polymer comprising a plurality of soft segments, and a plurality of hard segments, wherein the soft segments comprise polycarbonate polyol; and
   (b) a plurality of microspheres partially embedded and adhered to a first major surface of the binder resin layer, wherein the polyurethane polymer contains less than 30 percent by weight hard segments;
   wherein the hard segment comprises a crosslinker based on 7.5%-20% polyfunctional isocyanate;
   wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C.

2. The article of claim 1 wherein the amount of hard segments is 10 to 90 percent by weight, the amount of soft segments is 10 to 90 percent by weight, and the total amount of the hard and soft segments being at least 80 percent by weight, the weights being based on the weight of the polyurethane polymer.

3. The article of claim 1, wherein the change in storage modulus is less than 7 MPa from 25° C. to 175° C.

4. The article of claim 1, wherein the change in storage modulus is less than 5 MPa from 25° C. to 175° C.

5. The article of claim 1, wherein the storage modulus at 175° C. is greater than or equal to 0.2 MPa.

6. The article of claim 1, wherein the storage modulus at 175° C. is greater than or equal to 0.5 MPa.

7. The article of claim 1, wherein the plurality of microspheres are selected from at least one of glass, polymers, glass ceramics, ceramics, metals and combinations thereof.

8. The article of claim 1, wherein at least about 60% of the surface of the article is covered with the plurality of microspheres.

9. The article of claim 1, further comprising a second layer disposed along the second major surface of the binder resin layer.

10. The article of claim 9 wherein the second layer comprises a flexible material.

11. The article of claim 1, wherein the article is resistant to organic solvents.

12. The article of claim 1, wherein the article exhibits a coefficient of friction of less than or equal to 0.3.

13. The article of claim 1, wherein the article is heat bonded at elevated temperatures to a substrate.

14. The article of claim 1, wherein the soft segments have a number average molecular weight of less than 10,000 g/mol, and wherein the hard segments are derived from diols having molecular weights of less than 600 g/mol.

15. The article of claim 1, wherein the soft segments have a number average molecular weight of at least 500 g/mol.

16. The article of claim 1, wherein the soft segments have a number average molecular weight of 500 g/mol to 6,000 g/mol.

17. The article of claim 1, wherein the soft segments have a number average molecular weight of 500 g/mol to 3,000 g/mol.

18. The article of claim 1, wherein the binder resin layer has a thickness of 50 to 600 microns, and includes microspheres having an average diameter of about 30 to 200 microns.

19. The article of claim 1 wherein the polyurethane polymer contains less than 20 percent by weight hard segments and 15 to 90 percent by weight soft segments.

20. The article of claim 1, wherein the total amount of hard and soft segments in the polyurethane polymer is at least 80 percent by weight of the polymer.

21. An article comprising:
   (a) a binder resin layer comprising an aliphatic polyurethane polymer comprising a plurality of soft segments, and a plurality of hard segments, wherein the soft segments comprise polycarbonate polyol; and
   (b) a plurality of microspheres partially embedded and adhered to a first major surface of the binder resin layer, wherein the polyurethane polymer contains less than 30 percent by weight hard segments;
   wherein the hard segment comprises a crosslinker based on 7.5%-20% polyfunctional isocyanate;
   wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C., and
   wherein the article is thermoformable.

22. An article comprising:
   (a) a binder resin layer comprising an aliphatic polyurethane polymer comprising a plurality of soft segments, and a plurality of hard segments, wherein the soft segments comprise polycarbonate polyol; and
   (b) a plurality of microspheres partially embedded and adhered to a first major surface of the binder resin layer, wherein the polyurethane polymer contains less than 30 percent by weight hard segments;
   wherein the hard segment comprises a crosslinker based on 7.5%-20% polyfunctional isocyanate;
   wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C., and
   wherein the article passes the Flexibility Testing.

* * * * *